US012686594B2

(12) United States Patent
Cunningham et al.

(10) Patent No.: US 12,686,594 B2
(45) Date of Patent: Jul. 21, 2026

(54) ELEVATOR SAFETY BRAKING DEVICE

(71) Applicant: HYDRASAFE BRAKE, LLC, Chicago, IL (US)

(72) Inventors: Kevin Cunningham, Elburn, IL (US); Timothy Toan, Oak Park, IL (US)

(*) Notice: Subject to any disclaimer, the term of this patent is extended or adjusted under 35 U.S.C. 154(b) by 193 days.

(21) Appl. No.: 18/424,254

(22) Filed: Jan. 26, 2024

(65) Prior Publication Data

US 2024/0182266 A1 Jun. 6, 2024

Related U.S. Application Data

(63) Continuation-in-part of application No. 14/605,136, filed on Jan. 26, 2015, now Pat. No. 9,975,733.

(51) Int. Cl.

| | |
|---|---|
| ***B66B 5/16*** | (2006.01) |
| ***B66B 1/32*** | (2006.01) |
| ***B66B 5/00*** | (2006.01) |
| ***B66B 5/02*** | (2006.01) |
| ***B66B 5/06*** | (2006.01) |
| ***B66B 5/14*** | (2006.01) |
| ***B66B 7/04*** | (2006.01) |

(52) U.S. Cl.

CPC .................. *B66B 5/16* (2013.01); *B66B 1/32* (2013.01); *B66B 5/0031* (2013.01); *B66B 5/027* (2013.01); *B66B 5/06* (2013.01); *B66B 5/145* (2013.01); *B66B 7/047* (2013.01)

(58) Field of Classification Search

CPC .................................... B66B 5/16; B66B 5/18

See application file for complete search history.

(56) References Cited

U.S. PATENT DOCUMENTS

| | | | | |
|---|---|---|---|---|
| 5,230,406 | A | 7/1993 | Poon | |
| 9,975,733 | B2 | 5/2018 | Cunningham et al. | |
| 11,565,909 | B2 * | 1/2023 | Gou | B66B 1/36 |
| 2015/0151949 | A1 * | 6/2015 | Kocher | B66B 11/0293 187/359 |
| 2017/0029247 | A1 | 2/2017 | Kuczera et al. | |
| 2017/0029248 | A1 | 2/2017 | Kuczera et al. | |
| 2018/0127238 | A1 * | 5/2018 | Guo | B66B 11/0293 |

FOREIGN PATENT DOCUMENTS

| | | | | |
|---|---|---|---|---|
| CN | 1220965 A | * | 6/1999 | F16D 63/00 |
| CN | 1482994 A | * | 3/2004 | B66B 7/04 |
| CN | 104724575 A | * | 6/2015 | B66B 7/044 |

(Continued)

OTHER PUBLICATIONS

Machine Translation CN 1220956.*

(Continued)

*Primary Examiner* — Diem M Tran

(74) *Attorney, Agent, or Firm* — Michael P. Mazza, LLC; Michael P. Mazza

(57) ABSTRACT

An elevator safety device for an elevator car, which includes one or more hydraulically-powered braking assemblies mounted on the elevator car and designed to selectively brake on a guide rail of the elevator car upon detection of a predetermined safety condition, including an uncontrolled ascending or unintended movement of the elevator car, prior to actuation of any mechanical safety brake. The safety device may be used with traction-type or hydraulic-type elevators.

13 Claims, 18 Drawing Sheets

(56) References Cited

FOREIGN PATENT DOCUMENTS

| | | | | | |
|---|---|---|---|---|---|
| CN | 105565122 | A | * | 5/2016 | ......... B66B 11/0286 |
| DE | 102017209888 | A1 | * | 12/2018 | ............... B66B 5/18 |
| EP | 1067084 | A1 | * | 1/2001 | ............. B66B 17/34 |

OTHER PUBLICATIONS

Machine Translation EP 1067084.*
Peter A. Novak, P.E.; The Retroactive Mandated Ascending Car Overspeed and Unintended Car Movement Protection; Claddagh Controls Corp.; USA.
Hollister Whitney; Introducing and Installing the Rope Gripper; https://youtu.be/mkFmlyy1M8E?si=g1RjFtDhxDSpRbBk.

* cited by examiner

ELEVATOR SAFETY BRAKING DEVICE

RELATED APPLICATION

This application is a continuation-in-part of U.S. Ser. No. 14/605,136, filed Jan. 26, 2015, now U.S. Pat. No. 9,975,733.

BACKGROUND OF THE INVENTION

The present invention generally relates to devices for controlling the movement of elevators, and more specifically to an elevator safety device.

Archimedes is said to have built the first elevator in about 236 BC. In 1852, Elisha Otis introduced the safety elevator, which prevented the fall of the cab if the cable broke. The design of the Otis safety elevator is somewhat similar to one type still used today: a governor device engages knurled roller(s), locking the elevator to its guides should the elevator descend at excessive speed. Otis demonstrated his safety device at the New York exposition in the Crystal Palace in a dramatic, death-defying presentation in 1854, and the first such passenger elevator was installed at 488 Broadway in New York City on Mar. 23, 1857. The first electric elevator was built by Werner von Siemens in 1880 in Germany. The safety and speed of electric elevators were significantly enhanced by Frank Sprague, who added floor control, automatic elevators, acceleration control of cars, and safeties. His elevator ran faster and with larger loads than hydraulic or steam elevators, and 584 electric elevators were installed before Sprague sold his company to the Otis Elevator Company in 1895. Sprague also developed the idea and technology for multiple elevators in a single shaft. In 1882, when hydraulic power was a well-established technology, a company later named the London Hydraulic Power Company was formed, and constructed a network of high-pressure mains on both sides of the Thames which, ultimately, extended to 184 miles and powered some 8,000 machines, predominantly elevators (lifts) and cranes. In 1874, J. W. Meaker patented a method which permitted elevator doors to open and close safely (U.S. Pat. No. 147,853). In 1887, Alexander Miles of Duluth, Minnesota patented an elevator with automatic doors that would close off the elevator shaft.

Today, elevators are typically powered by electric motors that either drive traction cables or counterweight systems like a hoist, or pump hydraulic fluid to raise a cylindrical piston like a jack. A modern-day elevator consists of a cab (also called a "cage" or "car") mounted on a platform within an enclosed space called a shaft or "hoistway." In the past, elevator drive mechanisms were powered by steam and water hydraulic pistons or by hand. In a "traction" elevator, cars are pulled up by means of steel ropes rolled over a deeply-grooved pulley or "sheave," The weight of the car is balanced by a counterweight. Sometimes, two elevators are built so that their cars always move synchronously in opposite directions, and function as each other's counterweight. The friction between the ropes and the pulley furnishes the traction which gives this type of elevator its name.

Hydraulic elevators use hydraulic power to pressurize an above-ground or inground piston to raise and lower the car. Roped hydraulics use a combination of both ropes and hydraulic power to raise and lower cars. Recent innovations include permanent magnet motors, machine room-less rail (MRL) mounted gearless machines, and microprocessor controls.

MRL elevators are designed so that most of the components fit within the shaft containing the elevator car, while a small cabinet houses the elevator controller. Other than the machinery in the hoistway, the equipment is similar to a normal traction elevator. Benefits of an MRL elevator include: more usable space; uses less energy (70-80% less than hydraulic elevators); uses no oil; all components are above-ground similar to roped hydraulic-type elevators (removing the environmental concern created by hydraulic cylinders used on direct hydraulic-type elevators stored underground); slightly lower cost than other elevators; and can operate at faster speeds than hydraulics but not normal traction units. Detriments of MRL elevators include: equipment can be harder to service and maintain, and no code has been approved for the installation of residential MRL elevator equipment.

The technology used in new installations depends on a variety of factors. Hydraulic elevators are cheaper, but installing cylinders greater than a certain length becomes impractical for very-high lift hoistways. For buildings over about 7-stories, traction elevators must be employed instead. Hydraulic elevators are usually slower than traction elevators. The newest emerging technology for elevators is the development of ropeless traction elevators. These elevators have no counterbalance system and are propelled up and down the shaft by electric motors and specialized traction wheels.

Elevators are a candidate for mass customization. There are economies to be made from mass production of the components, but each building comes with its own requirements, such as a different number of floors, varying well dimensions, and differing usage patterns.

A more detailed discussion of conventional elevator design now follows, which will be helpful in understanding the invention and its advantages.

Roped Traction Elevators

Geared traction elevators are driven by AC or DC electric motors. Geared elevators use worm gears to control mechanical movement of elevator cars by "rolling" steel hoist ropes over a drive sheave which is attached to a gearbox driven by a highspeed motor. These machines are generally the best option for basement or overhead traction use for speeds up to 500 feet per minute (3 m/s). Historically, AC motors were used for single- or double-speed elevator machines on the grounds of cost and lower-usage applications where car speed and passenger comfort were less of an issue. For higher-speed, larger-capacity elevators, the need for infinitely-variable speed control over the traction machine becomes an issue, and DC machines powered by an AC/DC motor generator have been the preferred solution. The MG (Motor Generator) set also typically powered the relay controller of the elevator, which has the added advantage of electrically isolating the elevators from the rest of a building's electrical system, thus eliminating the transient power spikes in the building's electrical supply caused by the motors starting and stopping (causing lighting to dim every time the elevators are used for example), as well as interference to other electrical equipment caused by the arcing of the relay contactors in the control system.

The widespread availability of variable frequency AC drives has allowed AC motors to be used universally, bringing with it the advantages of the older motor-generator, DC-based systems, without the penalties in terms of efficiency and complexity. Older MG-based installations are gradually being replaced in older buildings due to their poor energy efficiency.

Gearless traction elevators are (low-RPM), high-torque electric motors powered either by AC or DC. In this case, the drive sheave is directly attached to the end of the motor. Gearless traction elevators can reach speeds of up to 2,000 feet per minute (10 m/s), or even higher. A brake is mounted on a machined drum between the motor and drive sheave to hold the elevator stationary at a floor. This brake is usually an external drum type and is actuated by spring force and held open electrically; a power failure will cause the brake to engage and prevent the elevator from falling. Such a brake is referred to here as a "mechanical safety brake."

With either geared or gearless traction elevators, cables are attached to a hitch plate on top of the cab or may be "underslung" below a cab, and then looped over the drive sheave to a counterweight attached to the opposite end of the cables, which reduces the amount of power needed to move the cab. The counterweight is located in the hoistway and rides a separate railway system; as the car goes up, the counterweight goes down, and vice versa. This action is powered by the traction machine which is directed by the controller, which is typically a relay logic or computerized device that directs starting, acceleration, deceleration and stopping of the elevator cab. The weight of the counterweight is typically equal to the weight of the elevator cab plus 40-50% of the capacity of the elevator. The grooves in the drive sheave are specially designed to prevent the cables from slipping. "Traction" is provided to the ropes by the grip of the grooves in the sheave. As the ropes age and the traction grooves wear, some traction is lost and the ropes must be replaced and the sheave repaired or replaced. Sheave and rope wear may be significantly reduced by ensuring that all ropes have equal tension, thus sharing the load evenly. Rope tension equalization may be achieved using a rope tension gauge, and is a simple way to extend the lifetime of the sheaves and ropes.

Elevators with more than 100 feet (30 m) of travel have a system called compensation. This is a separate set of cables or a chain attached to the bottom of the counterweight and the bottom of the elevator cab. This makes it easier to control the elevator, as it compensates for the differing weight of cable between the hoist and the cab. If the elevator cab is at the top of the hoist-way, there is a short length of hoist cable above the car and a long length of compensating cable below the car and vice versa for the counterweight. If the compensation system uses cables, there will be an additional sheave in the pit below the elevator, to guide the cables. If the compensation system uses chains, the chain is guided by a bar mounted between the counterweight railway lines.

Ropeless Traction Elevators

With the more recent development of electric vehicles and new small high torque motors, this technology is being used by innovators in the elevator industry to design a traction elevator that has no counterbalance system and no overhead elevator machine. This allows for a smaller elevator footprint in the construction of new buildings, providing owners with more leasable square footage. The drive system consists of a motor on each corner of the elevator that is connected to a geared drive system with a special high friction roller. This system propels the elevator up and down the rails. The controls for this system are on board the elevator and include a wireless system for receiving hall calls. The challenge for this system is to hold the elevator at the floor; to accomplish this, the motors need to be energized at all times, and the rollers engaged constantly. This will cause the elevator motors to overheat and rollers to wear prematurely. These designs will require an additional brake to solve this problem.

Hydraulic Elevators

Conventional hydraulic elevators use an underground cylinder, are quite common for low level buildings with 2-5 floors (sometimes but seldom up to 6-8 floors), and have speeds of up to 200 feet per minute (1 m/s). Hole-less hydraulic elevators were developed in the 1970s, and use a pair of above-ground cylinders, which makes it practical for environmentally or cost-sensitive buildings with 2, 3, or 4 floors. Roped hydraulic elevators use both above-ground cylinders and a rope system, allowing the elevator to travel further than the piston has to move.

The low mechanical complexity of hydraulic elevators in comparison to traction elevators makes them ideal for low rise, low traffic installations. They are less energy efficient: as the pump works against gravity to push the car and its passengers upwards, this energy is lost when the car descends on its own weight. The high current draw of the pump when starting up also places higher demands on a building's electrical system. There are also environmental concerns should the lifting cylinder leak fluid into the ground.

The modern generation of low cost, machine room-less traction elevators made possible by advances in miniaturization of the traction motor and control systems challenges the supremacy of the hydraulic elevator in its traditional market niche. However, hydraulically-controlled systems generally allow for greater control in an emergency situation where the elevator is stuck with passengers than traction elevators, and make it possible to safely lower the elevator to a controlled door zone for safe release from the elevator.

Controlling Elevators

Early elevators had no automatic landing positioning. Elevators were operated by elevator operators using a hand switch motor controller. The controller was contained within about a 1' by 2' cylindrical container operated using a projecting handle. This allowed some control over the energy supplied to the motor (located at the top of the elevator shaft or beside the bottom of the elevator shaft) and so enabled the elevator to be accurately positioned, if the operator was sufficiently skilled. More typically, the operator would have to "jog" the control to get the elevator reasonably close to the landing point and then direct the outgoing and incoming passengers to "watch their step." Some older freight elevators are controlled by switches operated by pulling on adjacent ropes. Safety interlocks ensure that the inner and outer doors are closed before the elevator is allowed to move. Most older, manually-controlled elevators have been retrofitted with automatic or semi-automatic controls.

Automatic elevators began to appear as early as the 1930s. Their development was hastened by striking elevator operators taking advantage of large cities such as New York and Chicago dependent on skyscrapers (and therefore their elevators). These electromechanical systems used relay logic circuits of increasing complexity to control the speed, position and door operation of an elevator or bank of elevators. Relay-controlled elevator systems remained common until the 1980s, when they were gradually replaced with solid-state microprocessor-based controls, which are now the industry standard.

General Elevator Controls

A typical modern passenger elevator includes an overload sensor which prevents the elevator from moving until any excess load has been removed, and which may trigger a voice prompt or buzzer alarm and/or trigger a "full car" indicator, indicating the car's inability to accept more passengers until some are unloaded. In addition to such comforts as electric fans and air conditioning units, modern elevators also typically include a control panel with call buttons to choose a floor, some of which may include key switches (to control access). In some elevators, certain floors may be inaccessible unless a security card is swiped or a password is entered, or both.

A set of doors may be kept locked on each floor to prevent unintentional access into the elevator shaft. The door may be unlocked and opened by a machine sitting on the roof of the car, which may also drive the doors that travel with the car. Door controls may be provided to immediately close or reopen the doors, although the button to close them immediately is often disabled during normal operations, especially on more recent elevators. Objects in the path of the moving doors will either be detected by sensors or physically activate a switch that reopens the doors. Otherwise, the doors will close after a preset time. Some elevators are configured to remain open at the floor until they are required to move again.

Elevators in high traffic buildings often have a "nudge" function, which will close the doors at a reduced speed, and sound a buzzer if the "door open" button is being deliberately held down, or if the door sensors have been blocked for too long a time. A stop switch (not allowed under British regulations) may also be provided to halt the elevator while in motion, and to hold an elevator open while freight is loaded. Keeping an elevator stopped for too long may set off an alarm. Unless local codes require otherwise, this will most likely be a key switch. An alarm button or switch, or a telephone, may also be provided, which passengers can use to warn the premises manager that they have been trapped in the elevator. Other controls may be provided as well.

Elevator Safety

Statistically speaking, cable-borne elevators are extremely safe. Of the 20 to 30 elevator-related deaths each year, most of them are maintenance-related, such as technicians leaning too far into the shaft or getting caught between moving parts, and most of the rest are attributed to other kinds of accidents, such as people stepping blindly through doors that open into empty shafts or being strangled by scarves caught in the doors. While it is possible, though unlikely, for an elevator's cable to snap, all elevators in the modern era have been fitted with several safety devices which prevent the elevator from simply free-falling and crashing. An elevator cab is typically borne by six or eight hoist cables, each of which is capable on its own of supporting the full load of the elevator plus twenty-five percent more weight. In addition, there is a device which detects whether the elevator is descending faster than its maximum designed speed; if this happens, a device called a "governor" causes bronze brake shoes to clamp down along the vertical rails in the shaft, stopping the elevator quickly, but not so abruptly as to cause injury. Such a device is also referred to here as a "mechanical safety brake." In addition, a hydraulic or mechanical buffer may be installed at the bottom of the shaft to somewhat cushion any impact.

Early hydraulic elevators built prior to a code change in 1972 were subject to possible catastrophic failure. The code had previously required only single-bottom hydraulic cylinders. In the event of a cylinder breach, an uncontrolled fall of the elevator might result. Because it is impossible to verify the system completely without a pressurized casing, it is necessary to remove the piston to inspect it. The cost of removing the piston is such that it makes no economic sense to re-install the old cylinder; therefore, it is necessary to replace the cylinder and install a new piston. Another solution to protect against a cylinder blowout is to install a "life jacket" or piston gripper. This is a device which, in the event of an excessive downward speed, clamps onto the cylinder and stops the car. A device known as a rupture valve is often attached to the hydraulic inlet/outlet of the piston and can be adjusted for a maximum flow rate. If a pipe or hose were to rupture, the flow rate of the rupture valve will surpass a set limit and mechanically stop the outlet flow of hydraulic fluid, thus stopping the piston and the car in the down direction. These rupture valves do not stop the elevator in the event of a piston jack failure.

ASME Codes

The American Society of Mechanical Engineers (ASME) has a specific section of Safety Code (ASME A17.1, Section 5.3) which addresses Residential Elevators. This section allows for different parameters to alleviate design complexity based on the limited use of a residential elevator by a specific user or user group. Section 5.3 of the ASME A17.1 Safety Code is for Private Residence Elevators, which does not include multi-family dwellings. Some types of residential elevators do not use a traditional elevator shaft, machine room, or elevator hoistway. This allows an elevator to be installed where a traditional elevator may not fit and simplifies installation. The ASME Board first approved machine-room-less (MRL) systems in a revision of the ASME A17.1 in 2007. MRL elevators have been available commercially since the mid 1990s; however, cost and overall size prevented their adoption to the residential elevator market until around 2010. (As of 2006, all states except Kansas, Mississippi, North Dakota, and South Dakota have adopted some version of ASME codes, though not necessarily the most recent.) Passenger elevators must also conform to many ancillary building codes including the International Building Code (IBC), Local or State building code, National Fire Protection Association standards for Electrical, Fire Sprinklers and Fire Alarms, Plumbing codes, and HVAC codes.

Existing Safety Concerns

Safety concerns for elevators remain. For example, while modern codes have regulated uncontrolled movement of elevators in the "down" direction, as to the about 300,000 traction elevators in the U.S., as well as the about 600,000 hydraulic elevators in the U.S., unintended and uncontrolled elevator movement is not regulated in the "up" direction. In addition, there is a significant void in the regulation of hydraulic elevators, as the codes currently require mechanical safety devices, such as gradual wedge-type safeties or a rope-gripping device on traction elevators, to control downward unintended and/or uncontrolled elevator movement, but such mechanical safety devices are often not useable with hydraulic elevators, and no such codes govern such movement for hydraulic elevators. As a result, hydraulic elevators often include no safety device, or improper safety devices, for unintended or uncontrolled movement, such as may be caused by catastrophic failure of the hydraulic system. (As one example, piston grippers have been installed in lieu of a piston replacement required by code for hydraulic jack assemblies manufactured prior to 1972. The piston gripper has certain limitations based on physical space required for the unit. Activation of the roper gripper in most cases causes passengers entrapment.)

Additionally, all currently available safety systems, used with either traction-type or hydraulic-type elevators, create an abrupt stop, and also entrap the passengers within the elevator until maintenance or emergency personnel can move the car to an adjacent floor and pry open the doors, which can take hours.

Accordingly, it is one of the objects of the present invention to provide a safety system for unintended and/or uncontrolled elevator movement that is safer and less cumbersome to install than available such systems, and that may be provided either on new elevators or retrofit on older elevators.

It is another object of the present invention to provide a safety system which, when activated, will safely and smoothly guide an elevator car, under control, to within the door zone of the next available floor for release of its passengers by emergency personnel.

It is still another object of the present invention to provide a safety system which may be easily installed on hydraulic elevators, as well as on geared and gearless traction elevators.

It is another object of the present invention to provide a retardant safety system which will hold the elevator car at floor level, even while a heavy load is added to the elevator (e.g., when loading a freight elevator with a heavy lead, typical elevator safety systems may permit the elevator to relevel or drop lower than the floor level).

It is still another object of the present invention to allow (e.g.) first responders to safely set the elevator using the safety device of the present invention, so that passengers may be removed, without the need for the first responders to first securely rig/fasten the elevator to ensure it does not move as passengers are removed.

It is a further object of the present inventio to provide a safety system which can detect that the door lock safety circuit is intact and not overridden by a physical jumper, allowing a technician to safely jump the door circuits while leading the technician to the area of trouble.

It is still another object of the present invention to provide a safety system which will sense an object in the elevator pit and will stop the elevator immediately, preventing technician injury.

It is yet another object of the present invention to provide such a safety system which is both cost-efficient to manufacture and easy to install or retrofit.

These and other objects of the present invention are realized by the present invention and its examples described below.

SUMMARY OF THE INVENTION

The objects mentioned above, as well as other objects, are solved by the present invention, which overcomes disadvantages of prior elevator safety devices, while providing new advantages not previously associated with them.

In a preferred embodiment, an elevator safety braking assembly is provided for use with a traction-type (with or without hoist ropes) or hydraulic elevator car carried by opposing guide rails and is designed to work in conjunction with a mechanical safety brake, if present. The mechanical safety brake actuates if one or more predetermined safety conditions are triggered. The elevator safety braking assembly of the present invention includes one or more hydraulically-powered braking assemblies mounted on at least top or bottom cross-rails, or a safety plank, of the elevator car, and designed to selectively brake on one or more of the guide rails prior to actuation of the mechanical safety brake, upon detection of the one or more predetermined safety conditions, including but not limited to one involving an uncontrolled or unintended movement of the elevator car other than that which would actuate the mechanical safety brake.

The one or more hydraulically-powered braking assemblies preferably include an integrated, submersible caliper case housing a piston and brake pad. The brake pad preferably includes a Kevlar composite material with bronze weave embedded in the pad. The piston preferably has a diameter in the range of about 2.5-3.0 inches, and most preferably a diameter of about 2.75 inches. This preferred example of the safety braking assembly is useable for elevators with car speeds between 100-2000 feet-per-minute and can accommodate gross loads up to and exceeding 10,000 pounds.

The one or more predetermined safety conditions can concern one or more of the following: a predetermined speed is exceeded, whether in the ascending or descending direction; elevator door lock jumper protection; elevator pit encroachment; retardant braking (preventing heavy load from moving elevator off of floor level); and setting the elevator to remove passengers without first securely rigging/fastening elevator; conditions of elevator hoist doors, and of elevator car doors; conditions of an elevator safety string; an elevator system encoder; brake inputs; valve inputs; door circuits; loss of power; movement of the elevator with the doors open; and detection of a door jumper. The elevator safety string may include safety circuits which monitor one or more of the following: reverse phase relay; top and bottom final; pit switch; car top stop switch; governor overspeed switch; safety operated switch; and drive ready relay.

Each of the one or more hydraulically powered braking assemblies may include one or more roller guides in mechanical connection with one or more of the guide rails, and hydraulic disc brakes. The roller guides may include shock-absorbing elements such as springs. In the alternative, instead of roller guides, solid shoes may be used.

The elevator safety braking assembly of the present invention may be used with guide rails having differing cross-sectional shapes, such as T-shaped, hat-shaped, omega-shaped, and round.

Use of the present invention preferably addresses each of the objects mentioned above. For example, it allows a bypass of door lock inputs of the elevator car while operating manually at an inspection speed, enabling safe and controlled location and repair of a faulty door lock. Additionally, use of the present invention also: provides a retardant safety system which will hold the elevator car at floor level, even under heavy loads; allows first responders to safely set the elevator in position to allow passengers to be removed, without first securely rigging/fastening the elevator; detects and prevents pit encroachment; and detects whether the door lock safety circuit is intact and not overridden by a physical jumper.

It will be apparent to those of ordinary skill in the art that the present invention may be retrofit to pre-existing traction-type or hydraulic elevator cars.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Mechanical safety brake" means a secondary safety brake, in addition to the primary elevator brake mounted on a machined drum between the motor and drive sheave, such as: (a) a "governor" causing brake shoes to clamp down along the vertical rails in the shaft, designed to actuate if the elevator car exceeds a predetermined speed in the down direction; or (b) (more recently) a bidirectional "governor" safety brake designed to actuate if the car exceeds a predetermined speed in the up or down direction. Such mechanical safety brakes may also actuate if another predetermined safety condition is triggered. Conventionally, no mechanical safety brake has existed for hydraulic elevators.

"Hydraulically-powered braking assembly" or "HydraSafe® brake" means the safety brake of the present invention, designed to actuate, for either a traction or hydraulic elevator, prior to actuation of the mechanical safety brake, if applicable, and upon detection of a safety condition (whether involving an uncontrolled or unintended movement of the elevator car, or another safety condition as discussed here).

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
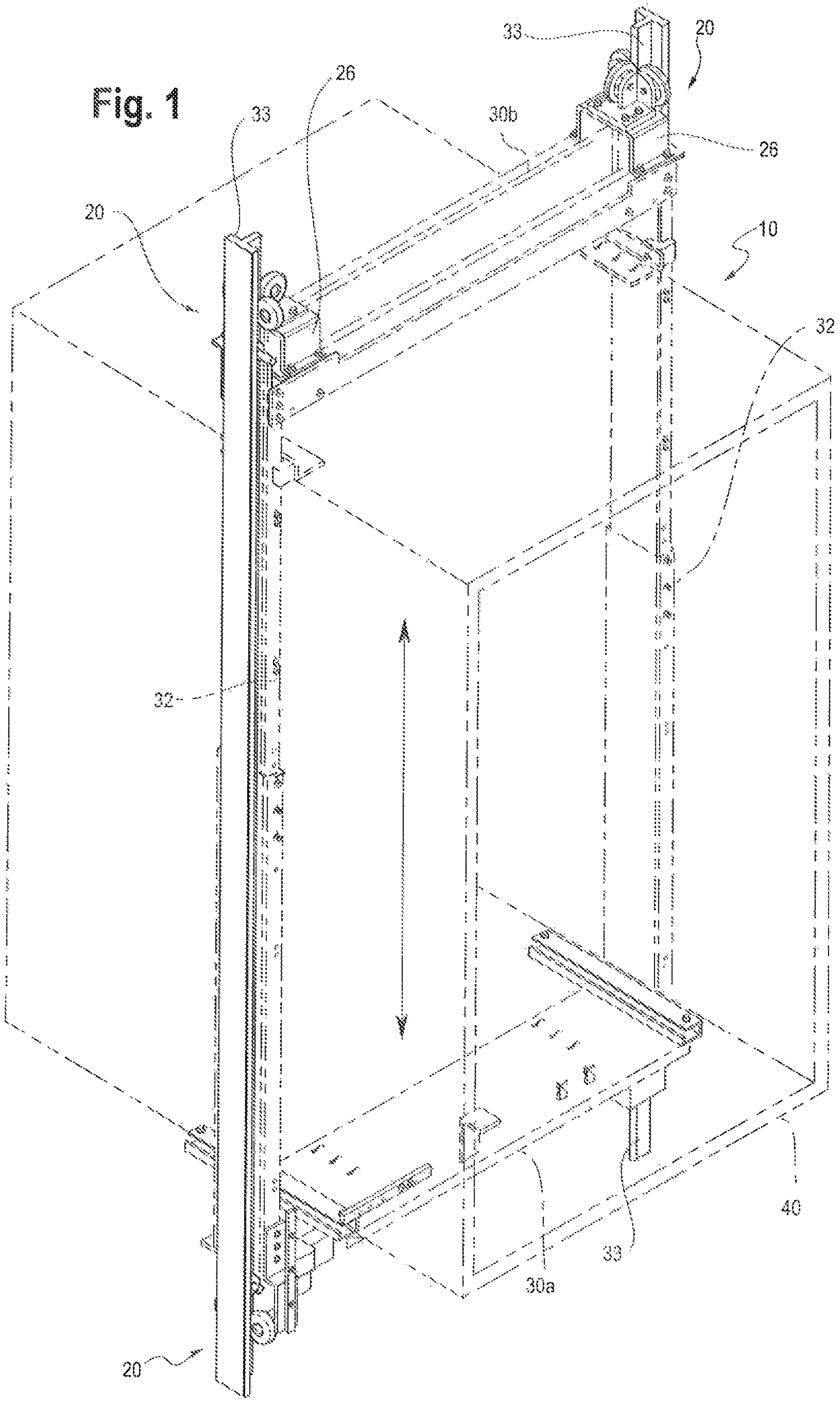
FIG. 1 is a perspective top and side view of one embodiment of the safety brake invention as shown for use with a traction elevator car.
Figure 2:
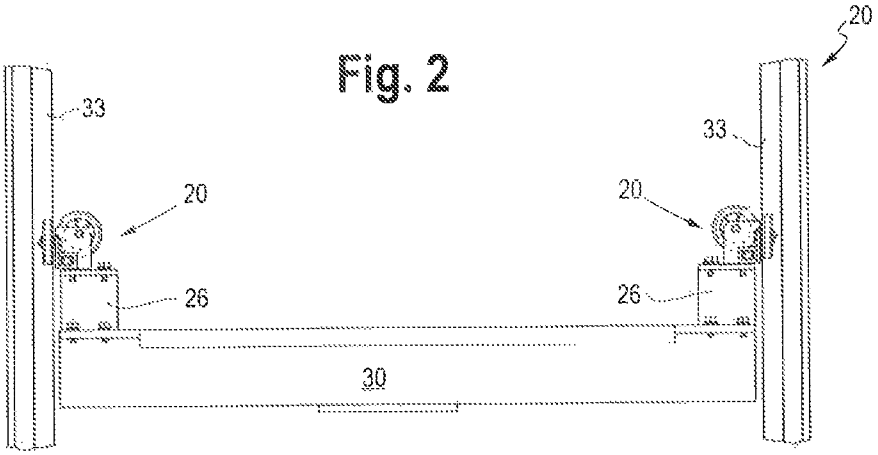
FIG. 2 is a partial front perspective view of the embodiment shown in FIG. 1.
Figure 3:
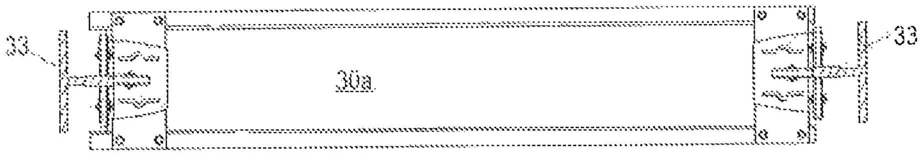
FIG. 3 is a bottom perspective view of the embodiment shown in FIG. 1.
Figure 4:
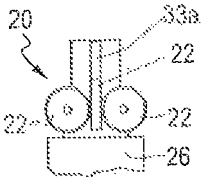
FIG. 4 is a partial side perspective view of the safety brake shown in FIG. 1.

Referring to FIG. 1, one embodiment of the elevator safety brake device ("Hydrasafe®" brake) of the present invention is shown, and designed generally with the reference numeral 20, designed for use with elevator car 10. Elevator safety brakes 20 may be used to brake roped traction elevators, non-roped traction elevators, or hydraulic elevators. In the embodiment shown in the drawings, safety brakes 20 are used to brake a traction elevator car 10 with cross-rails 30 and guide rails 33.

Figure 7:
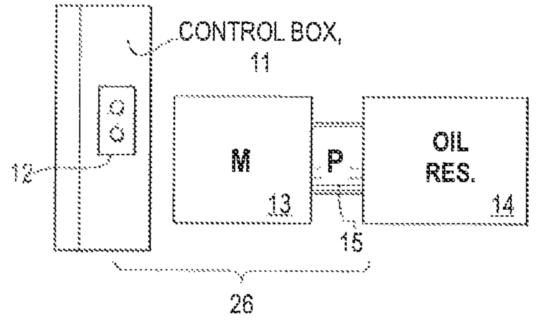
FIG. 7 is a schematic view of an embodiment of the control box and hydraulics that may be used to power and control the safety brake of the present invention.
Figure 8:
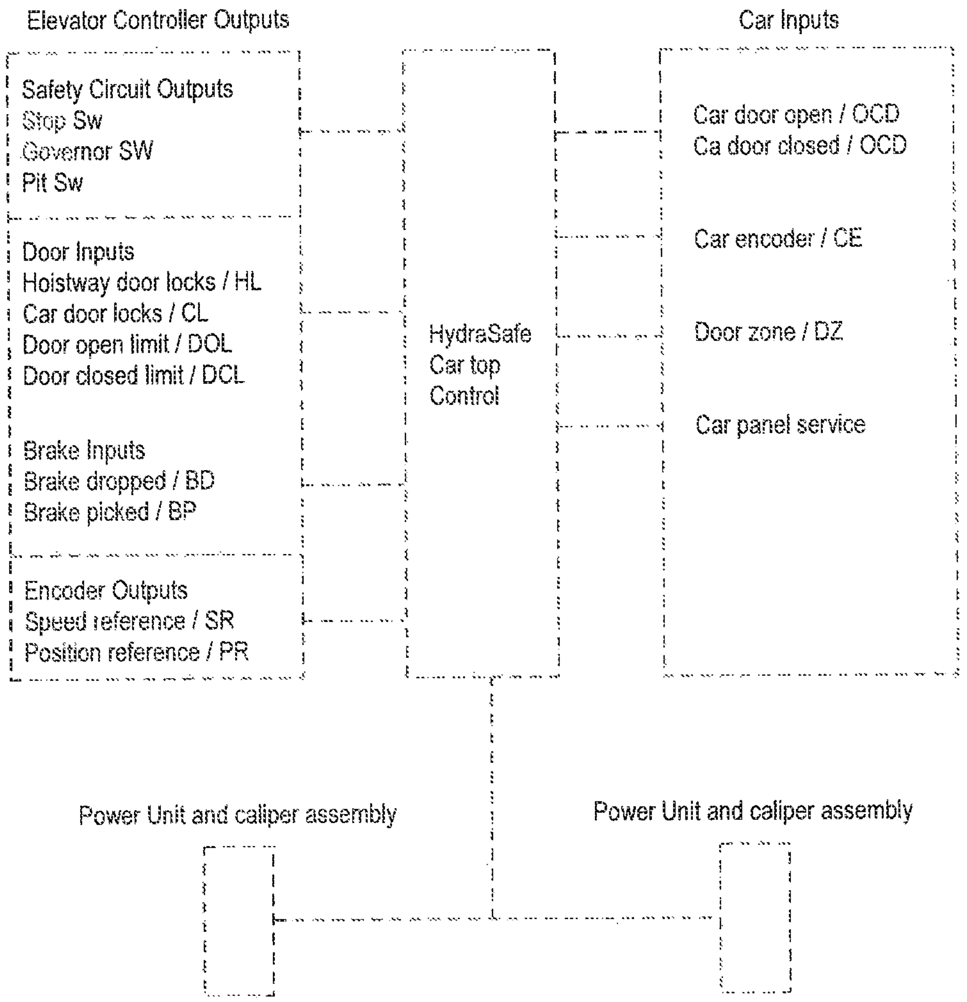
FIG. 8 is a schematic view of the HydraSafe® brake control, relative to elevator controller outputs and elevator car inputs.

Referring to FIG. 7, control and power for safety brakes 20 may be provided, such as by using a control box 11, hydraulic valves 12, pump motor 13, an oil reservoir 14 in fluid communication with the pump motor, and an accumulator 15 for maintaining appropriate oil pressure in the lines. Hydraulic lines (not shown) may be used to provide pressurized oil between hydraulic valves 12 and safety brakes 20.

Figure 9:
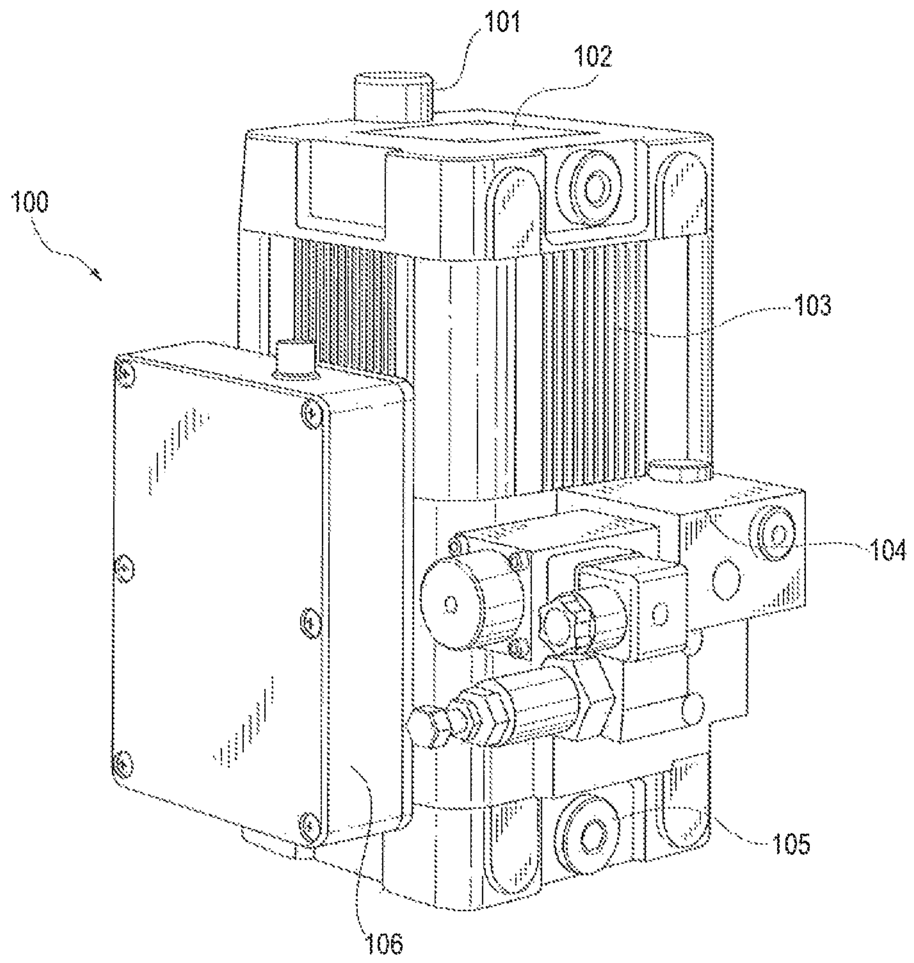
FIG. 9 is a perspective view of a preferred embodiment of a submersible power unit useful with the present invention.

Referring to FIG. 9, an alternative, preferred power unit 100 is shown, which is an all-in-one submersible unit that encloses the motor valve and oil reservoir in a single housing. With power unit 100, the caliper oil lines have been moved into a one-piece brake caliper casting 120, and the piston diameter associated with the calipers has been increased (from 1.92" to piston diameters, such as about 2.5"-3' piston diameters, and most preferably about a 2.75" piston diameter) to provide increased stopping forces and a wider range of applications. Somewhat counterintuitively, the larger piston diameter results in less pressure, and less area of coverage on the guide rails, which can be advantageous as less pressure provides less leak points and requires less maintenance. Also, a lower PSI also provides an advantageous baseline pressure, should a future need arise to increase the pressure for a particular application.

Use of the current piston size diameter of 2.75" with the caliper design disclosed here provides a single braking device capable of covering all duty ranges of elevator car speeds between 100-2000 feet/minute, while providing the ability to hold higher gross loads with capacities in excess of 10,000 pounds, providing great flexibility. (A larger piston diameter results in greater stopping and holding forces.)

Hydraulic elevators and ropeless elevators require higher stopping and holding forces. The pressure required by the 2.75" piston to provide an equal stopping force as the 1.92" piston is reduced substantially; this also allows the use of a more efficient AC motor in a fully enclosed submersible power unit that can produce up to 10,000 psi for special application on elevators of a larger size and capacity. This change also reduces the possibility of oil contamination on the elevator. (Prior designs utilized different oil lines running to each different brake assembly.)

Figure 10:
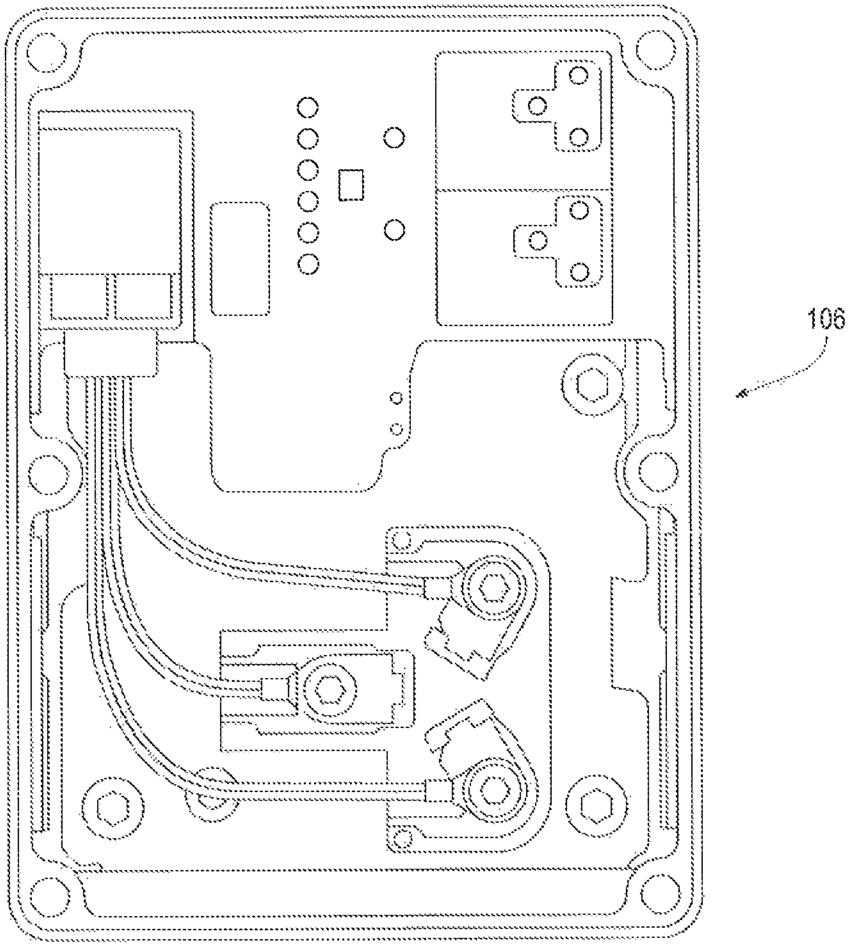
FIG. 10 is a perspective view of a preferred embodiment of an electrical communication box layout found in the communication box within the power unit of FIG. 9.

Still referring to FIG. 9, submersible power unit 100 includes: hydraulic fluid filler port 101; type plate/data tag 102 (identifying voltage and other requirements for the power unit); tank 103, which may contain a pump, motor, power unit sensor and external fan (not shown); connection block 104, with free ports for direct piping connection, a pressure or return line filter, and valves (not shown); hydraulic fluid drain 105; and communication box 106, for motor connection, sensors and visualization, and external fan connection, if present. FIG. 10 shows a schematic view of communication box 106, showing the electrical wiring to power the motor.

Figure 11:
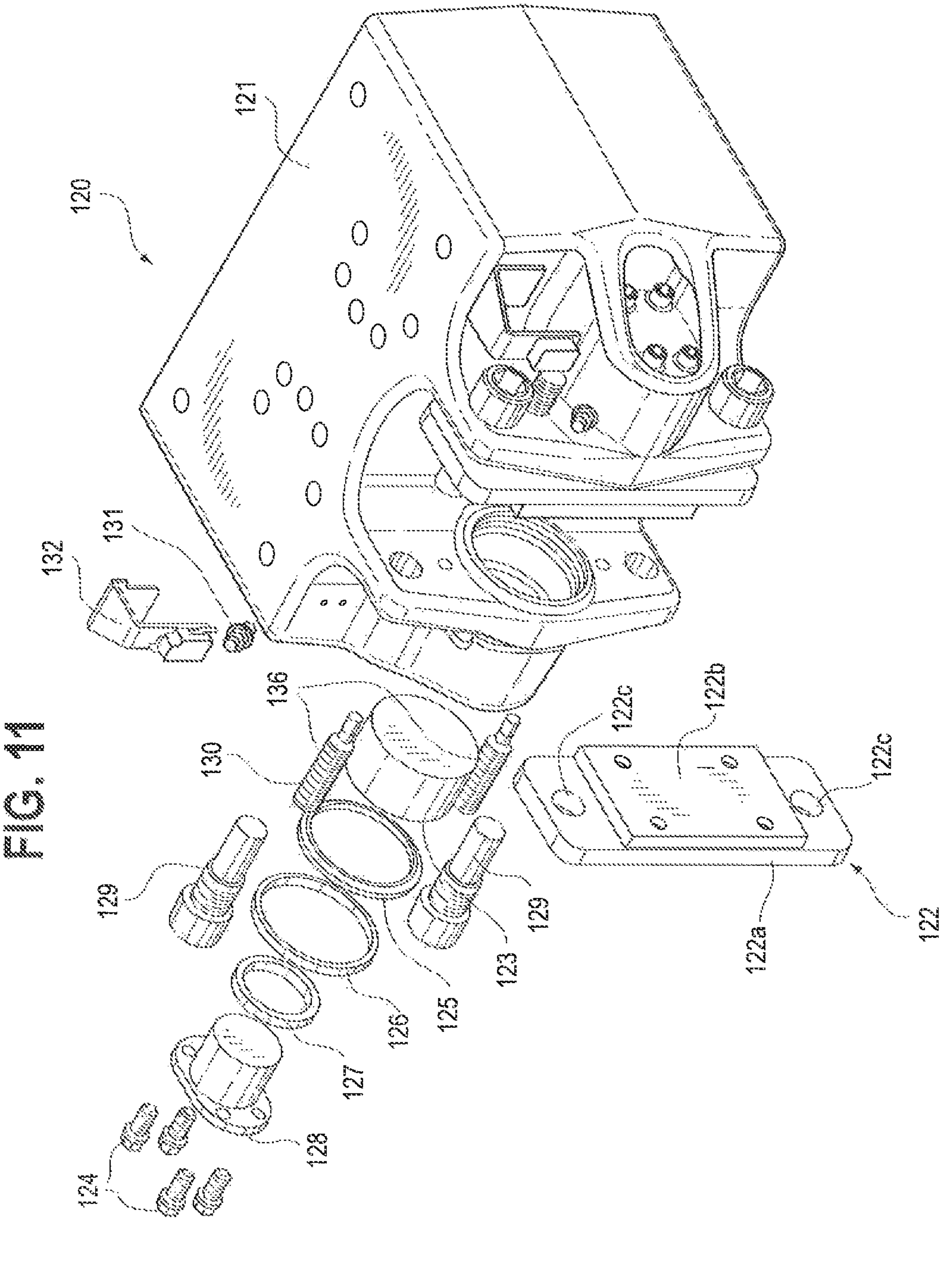
FIG. 11 is a planar perspective view showing a particularly preferred brake unit, and component parts, of the present invention.
Figure 11A:
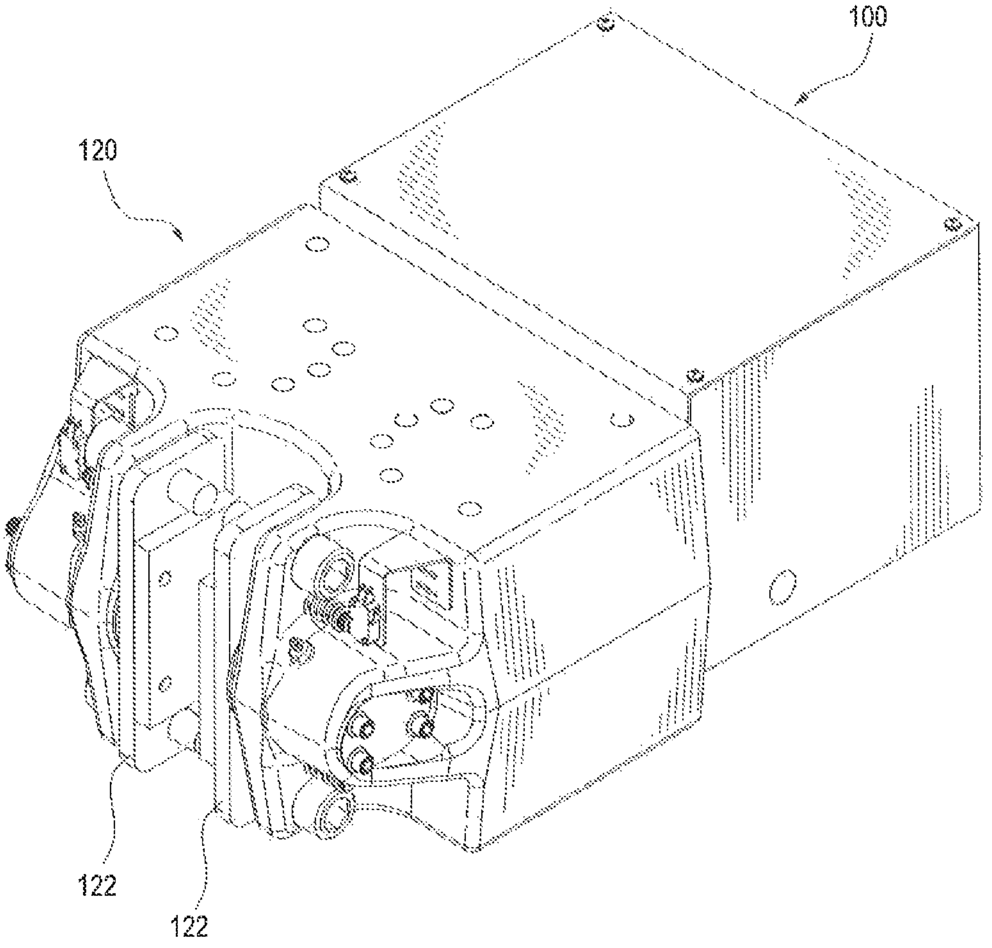
FIG. 11A is a planar perspective view of the assembled brake and power units.

Referring now to FIGS. 11 and 11A, a preferred brake unit 120 is shown. Brake unit 120 includes an integrated caliper case 121 which may be made of steel. Brake unit 120 also includes piston 123. The following parts are mounted to piston 123, as shown, using fasteners 124: piston wiper seal 125 (wipes excessive fluid); pressure seal 126; end cap seal 127; and end cap 128. Brake pad pins 129 mount brake pad 122 to caliper case 121 using apertures 122*c*. Brake pad return springs 130 are used to cushion the brake pad. Bleeder valve 131 is used to bleed air out of the hydraulic lines, and out of the system. Activation sensor 132 is used to advise the controller whether the Hydrasafe® brake is set or not set. (Rather than using a programmable logic controller (PLC), the control interface preferably utilizes a computer board interface (not shown).)

Back plate 122*b* of brake pad assembly 122 may be mounted on caliper case 121 (brake pad pins 129 pass through apertures 122*c* on brake pad assembly 122, and apertures 121*a* on caliper case 121). Piston 123 contacts brake pad 122*a*, which pushes against mounting plate 122*b*, causing plate 122*b* to contact the guide rails (not shown).

Brake pad 122*a* of brake pad assembly 122 may be a bronze pad or a ceramic pad or a pad made of a composite material, depending upon the duty, speed and capacity of the elevator involved. Preferably, a pad found durable as well as covering a wide range of duties is a Kevlar composite pad with bronze weave embedded in the pad, such as the AFT200 brake pad available from Champion Technologies, 845 McKinley Street, Eugene, Oregon. These pads have a longer life cycle and better heat dissipation. The AFT200 is a phenolic-treated, brass-wire-inserted, cloth-laminated pad treated under heat and pressure to a dense, strong composite. AFT-200 provides good fade and wear resistance and may be machined using standard, industry-accepted practices.

Brakes 20 may consist of identical left and right safety devices located at opposing ends on the top of an elevator car 10, and may be attached to the cross-rail 30 of the car. (Alternatively, a pair of safety devices could be manufactured as an integral, single unit, connected by a rigid connecting plate spanning and connected to the cross-rail.)

Figure 5:
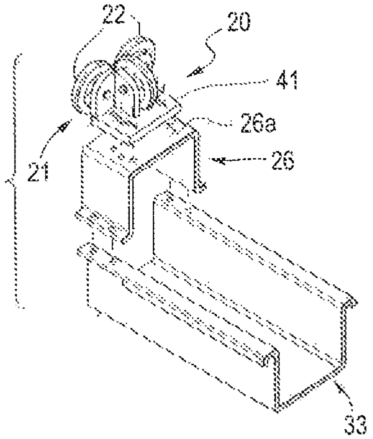
FIG. 5 is a partial, enlarged top and side perspective view of one of the safety brakes as it may be attached to a U-shaped guide rail of an elevator car.
Figure 5A:
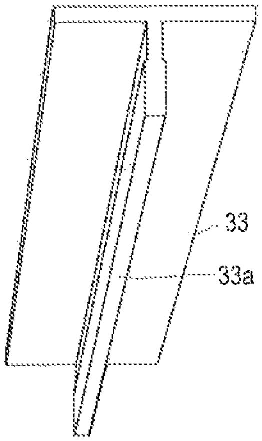
FIGS. 5A-5B are partial, enlarged bottom and side perspective views of T-shaped and omega-shaped guide rails of the elevator car, respectively.
Figure 5B:
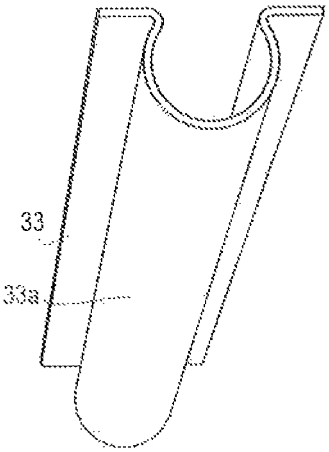
Figure 5C:
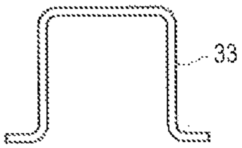
FIGS. 5C-5D are front views of hat-shaped and round guide rails of the elevator car, respectively.
Figure 5D:
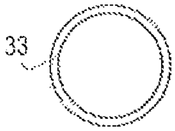
Figure 6:
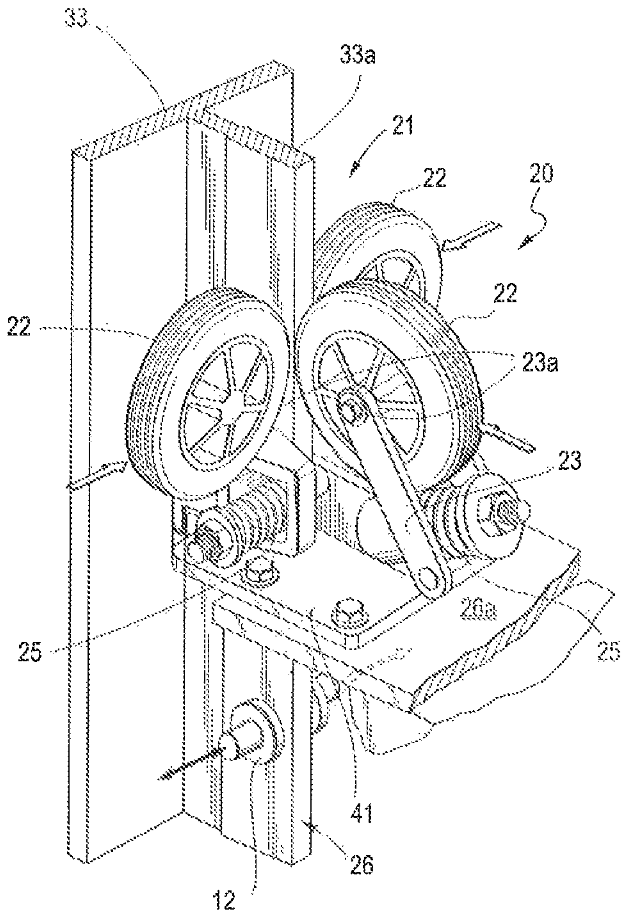
FIG. 6 is a partial, enlarged top and side perspective view of a safety brake and its surrounding environment as shown in FIG. 1.

Referring now to FIGS. 3-6, safety brakes may each include a roller guide or slide guide (e.g., sliding shoe) assembly 21, such as three solid shoes or rollers or wheels 22 mounted on arms 23, enabling the safety device to move the elevator car along style 32 (i.e., the vertical steel support portion of the sling) adjacent guide rail 33. Arms 23 may be welded to flange plate 24, which may in turn be attached to cross-rail 30, such as shown in FIG. 5. Flange plate 24 may be otherwise rigidly secured to cross-rail 30, such as by drilling holes and using fasteners, or using clamping devices. Shock-absorbing springs 25 may be mounted on arms 23 to dampen vibration. Opposing disc brakes 26 may be attached at the proximal end 23*a* of two of the arms 23, adjacent style 32.

Flange plate 24 is preferably positioned relative to cross rail 30 so that rollers 22 closely surround and hug vertical guide rail 33. Using an appropriate control scheme, hydraulic fluid can be selectively supplied to disc brakes 26, causing the opposing disc brakes to move toward each other and securely clamp on guide rail 33, stopping the elevator car when desired. Shock-absorbing rollers 22 ensure a smooth ride for the occupants of elevator car 40.

Those of ordinary skill in the art will now appreciate that using the present invention, a hydraulic disc braking system may be installed on the cross-head/crossrail, below a roller guide assembly, so that the elevator car may be smoothly and selectively braked on the vertical guide rail. Alternatively, those of ordinary skill in the art will appreciate that if the safety braking system of the invention cannot be installed on the cross-head/cross-rail for some reason, or otherwise on the car top, then it may be installed on the existing safety plank (similar to cross-head, located just under the car, made up on the bottom cross-beams, and houses the existing safeties). Additionally, it will be understood that if the car size or speed requires more than just two safety brake units, four may be installed in each corner of the car.

Persons of ordinary skill will also appreciate that the present invention may be advantageously employed with guide rails of different geometries other than the T-shaped geometry shown in FIG. 5, including those which are hat-shaped, omega-shaped, round, etc. Flange plate 24 will be appropriately designed and shaped to fit this guide rail geometry. Additionally, it will also be understood that the rollers and disc brakes may be located in different orientations than those shown in the drawings, in order to accommodate the differing geometries of different guide rails.

It will be appreciated that on larger (e.g., freight) elevators and/or higher-speed elevators, it may be desirable to install an opposing pair of safety devices 20 on both the top and bottom of an elevator car 10.

Those of ordinary skill will appreciate that hydraulic disc brakes 26 may be "pulse" disc brakes (which operate similar to the ABS system on an automobile, except that the disc brakes are applied to the vertical steel guide rails associated with an elevator, instead of the discs associated with the wheels of an automobile). This ability allows for the rescue of passengers trapped in an express travel zone with no elevator entrances. As one non-limiting example, a commercially available disc brake which may be used is made by MICO, Model Number 02-520-152.

Referring to FIG. 7, within control box 12 a controller, such as a (PLC or computer board interface, may be located on the top of the elevator car; within the car or in the elevator control space. The PLC or computer board interface may be in serial communication with an elevator control panel located in the machine room or central control room of the building housing the elevator cars. The PLC or computer board interface may be provided with software enabling the control of the elevator systems described here. Safety devices 20 may be provided which, in addition to providing the controlled braking action mentioned above, may also be equipped to monitor one or more of the following, as is well known in the art: the elevator safety string; the elevator system encoder (a tapeless system may use, for example, a lazar positioning device, an absolute encoder mounted on the governor and a four sensor selector on the car top to read the door zone magnet for each floor); brake inputs; valve inputs; door circuits; movement of the elevator with the doors open; excess speed in the up or down direction; pit encroachment: and activation by first responders in an emergency event.

As is known in the art, a "safety string" may be initiated when a safety is open. Safety circuits may monitor the following, for example: reverse phase relay; top and bottom final; pit switch; car top stop switch; governor overspeed switch; safety operated switch; and drive ready relay. Here is an explanation of the function of each such safety circuit:

Reverse phase relay: Monitors the incoming power legs of the three-phase power source; if all three legs are not seen the unit goes into fault and opens the safety string.

Top and bottom final: Switches located just above the top floor and just below the bottom floor. If the elevator goes above the top floor by the code-required amount or below the bottom floor, they open the safety string.

Pit switch: An additional stop switch, located in the elevator pit for use by service personnel, Car top stop switch: An additional stop switch located on the car top and/or in the car, for use by service personnel; when activated, it opens the safety string.

Governor overspeed switch: This switch is located on the elevator governor and when the governor trips, it will open the safety string.

Safety-operated switch: Also known as the S.O.S. switch, it may be located on the safety plank under the elevator car; once the safeties are actuated, this switch opens the safety circuit.

Drive ready relay: A relay that instructs the elevator system that the drive is ready to run. This relay is driven by the internal safety circuits of the drive.

Those of ordinary skill will appreciate that the bottom cross-rail of a traction-type elevator may be referred to here as the "safety plank," while the bottom cross-rail of a hydraulic elevator may be referred to here as a "bolster channel."

As a non-limiting example, independent signals from devices located on the elevator, and directly wired to the PLC or computer board interface may be compared with elevator controls for redundancy, so that the elevator is not allowed to operate with crucial circuits jumped from the machine room. For example, in a preferred elevator system of the present invention, the actual condition of the elevator hoistway doors and the car door may be monitored. If the controller input indicates the doors are closed and does not see the same input from the car, the brakes may engage, indicating the system is jumped/bypassed out. (This will be code-required when the 2013 ASME code is enforced. Jumping/bypassing of door circuits is a common practice in working on faulty door locks.) This will not only allow the circuit to be bypassed safely, but it will also provide information to the failed lock. Once the jumper/bypass wiring is installed, the technician at the elevator will be able to place the system on door lock test mode and manually run the car with the doors jumped/bypassed out on inspection speed to find and repair the faulty door lock. The device will not reset until the controller circuits are restored. A USB port may be provided in the car operating panel for troubleshooting and testing of safety devices 20. Thus, as one non-limiting example, and as likely required by 2013 ASME codes, safety devices 20 will "know" when a door lock has "jumped out."

In a particularly preferred embodiment, a PLC or computer board interface will govern the operation of safety devices 20 in a manner which will permit the oversight and control of various elevator safety functions, such as: (1) if an overspeed condition is detected in either direction, safety devices 20 will gradually slow the elevator to the next available stop within the door zone and then remove the corresponding elevator(s) from service so that maintenance personnel may repair the elevator(s); (2) if the doors are open and excessive movement is detected, safety devices 20 may brake the elevator(s) in question after a set time and, sounding a warning, will also close the door(s) until the inputs are restored or manually reset; (3) if the doors are open and the brake input is not detected, safety devices 20 will immediately brake the elevator(s) until the brake signal is restored; and (4) if the system sees the elevator controls showing doors closed and the braking system does not have the closed signal from the car door, safety devices 20 will immediately brake the elevator(s) until the inputs are corrected; (5) if the system detects a person in the elevator pit the safety devices 20 will set and will need to be manually reset once the pit area is clear; (6) in the event of an elevator entrapment with passengers and the fire department or first responders arrive first to extract the passengers a manual set feature is available to set safety devices 20 to ensure the elevator will not move while removing passengers. Once the passengers are removed the device will need to be manually reset by authorized elevator personnel; (7) if the elevator is traveling uncontrolled in the up or down direction in a express zone that has no elevator entrances, safety devices 20 will slow the elevator down to a controlled stop within an elevator door zone and set until failure is corrected and manually reset by an authorized personnel; and (8) if a traction elevator system has no hoist ropes, safety devices 20 will set every time the elevator lands at a floor to hold the elevator in place and allow power for the drive motors to be removed for loading and unloading and for unintended motion and uncontrolled motion; (9) if the main power source for the elevator fails and there is a loss of power, safety devices 20 will set immediately and will need to be manually reset by a technician.

During manufacture, if preferred, safety devices 20 may be preset in a predetermined manner to accommodate a particular elevator rail size, roller guide type, speed and capacity. One preferred method for retrofit assembling safety devices 20 to a traction-type or hydraulic-type elevator is now described. As is known in the art, bolts may be used to secure the top of the styles (item 32 on FIG. 1) and to center the car sling on the rails. The elevator car guides may now be removed, and a drilling template may be placed on the crosshead as per the instructions on the template. Using (e.g.) a Mag drill with an 11/16" bit, adapter plate mounting holes may be drilled as shown on a template which may be provided. Secure the adapter plate to the crosshead (e.g., using prelabeled fasteners), tightening the bolts to 212 ft/lb. Now release the quick-connect fitting in the power unit box to remove the power supply from the caliper body, and place the HydraSafe® caliper body on the adapter plate, and then slide the body into the rail, making sure the pads are (e.g.) %4-inch back from the inside of the rail face. Center the pads on the rail, leaving a 3/16" air gap between the pad and the rail. Now install the caliper body to the adapter plate using (e.g., prelabeled) caliper body bolts. Next, slide the power unit into the caliper body, and connect the oil lines via the quick-connect fittings, and secure the power unit box to the caliper body using (e.g.) prelabeled power unit fasteners. Next, mount the power unit box between the two HydraSafe@ brake units 20 using (e.g.) provided unistrut and hardware (if accepted per code), and install ½" flexible EMT and pull the wires into each unit. Now, plug each power unit into the terminal blocks located in the power unit. Wire in a dedicated 110 VAC feed to the car top box (such as per drawings provided). Using a test switch mounted in the (e.g.) car top box, set the devices and check operation. Now bleed the air out of the lines (using, e.g., an included bleeder hose and bottle), as known in the art. Next, install the car top encoder and wire it into the HydraSafe® car top controller. Also wire travel cable wires from the HydraSafe® controller interface to the HydraSafe® car top controller.

Figures 12, 12A:
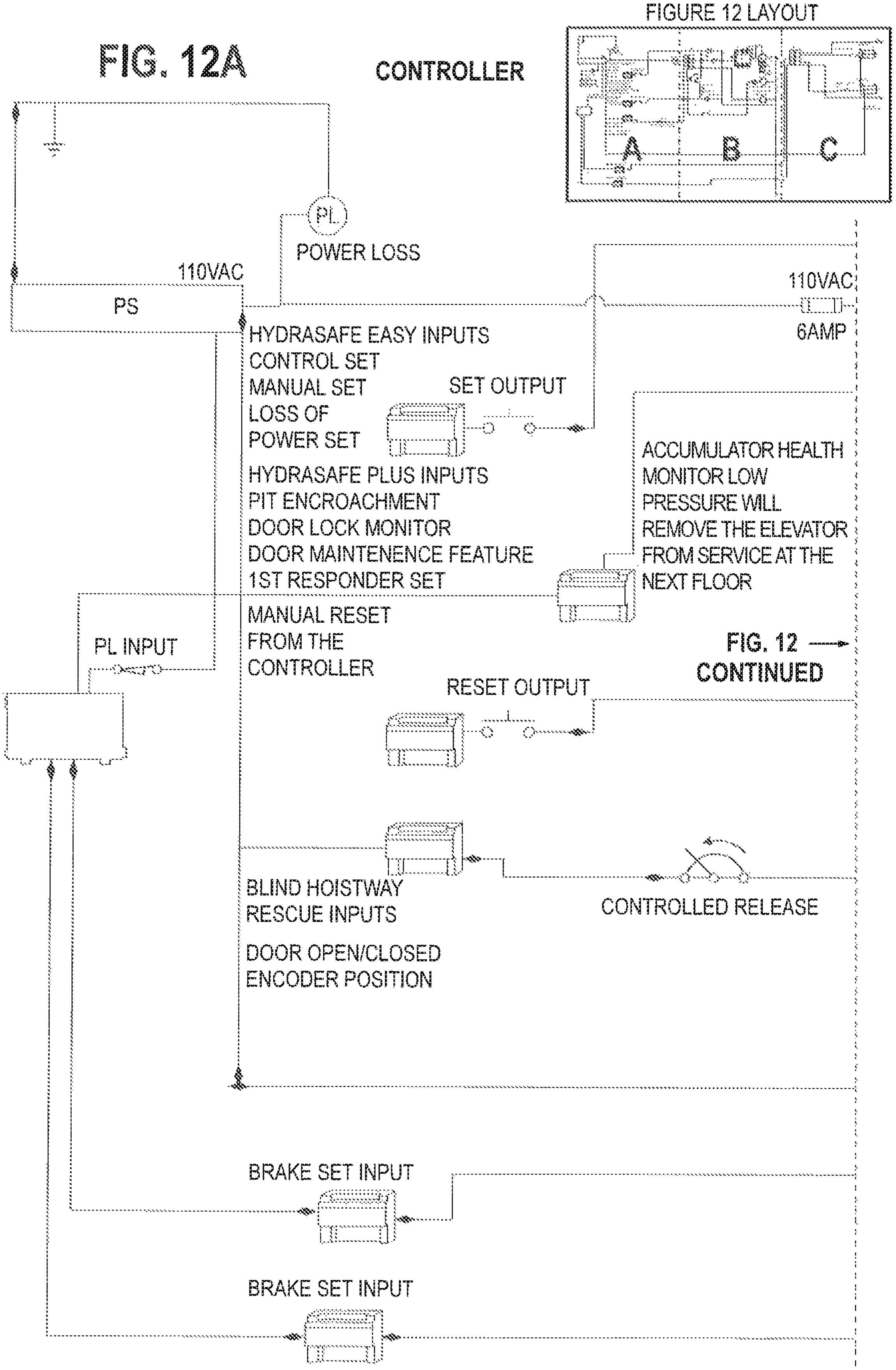
FIG. 12 is a preferred wiring diagram for an exemplary electrical system using the HydraSafe® safety brakes, including FIG. 12A (the controller)
Figure 12B:
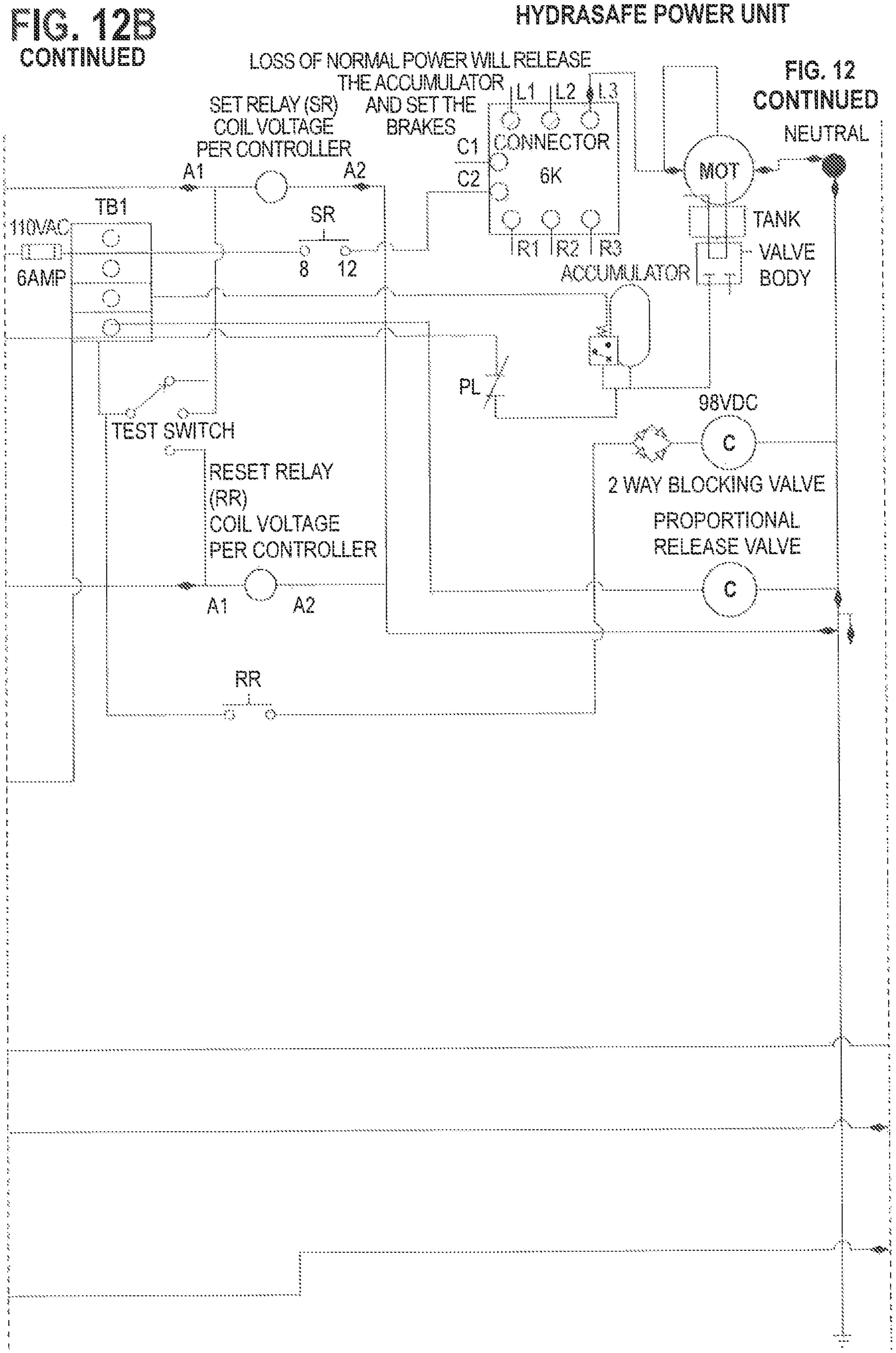
FIG. 12B (the HydraSafe® power unit)
Figure 12C:
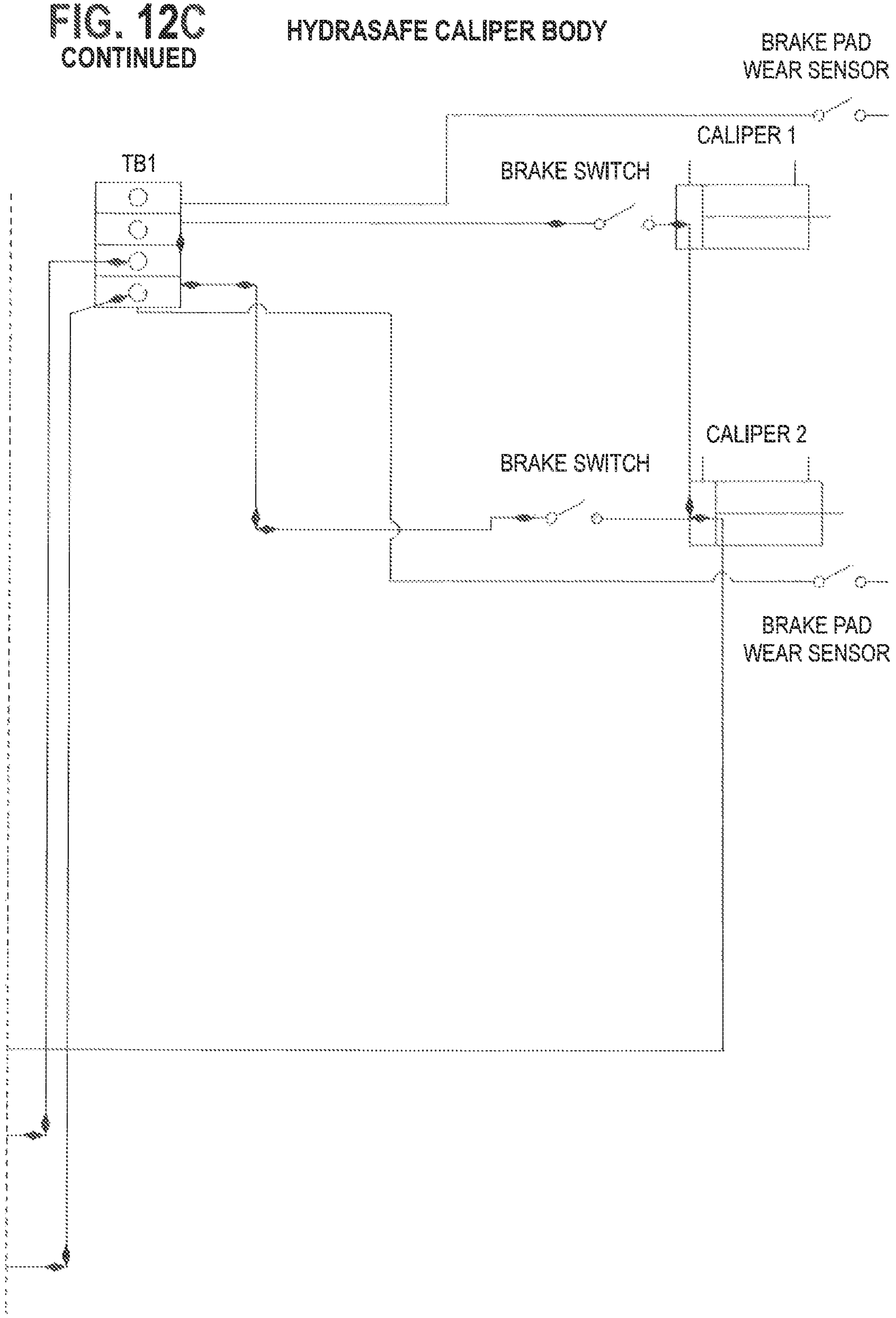
FIG. 12C (the HydraSafe® caliper body).
Figure 9:
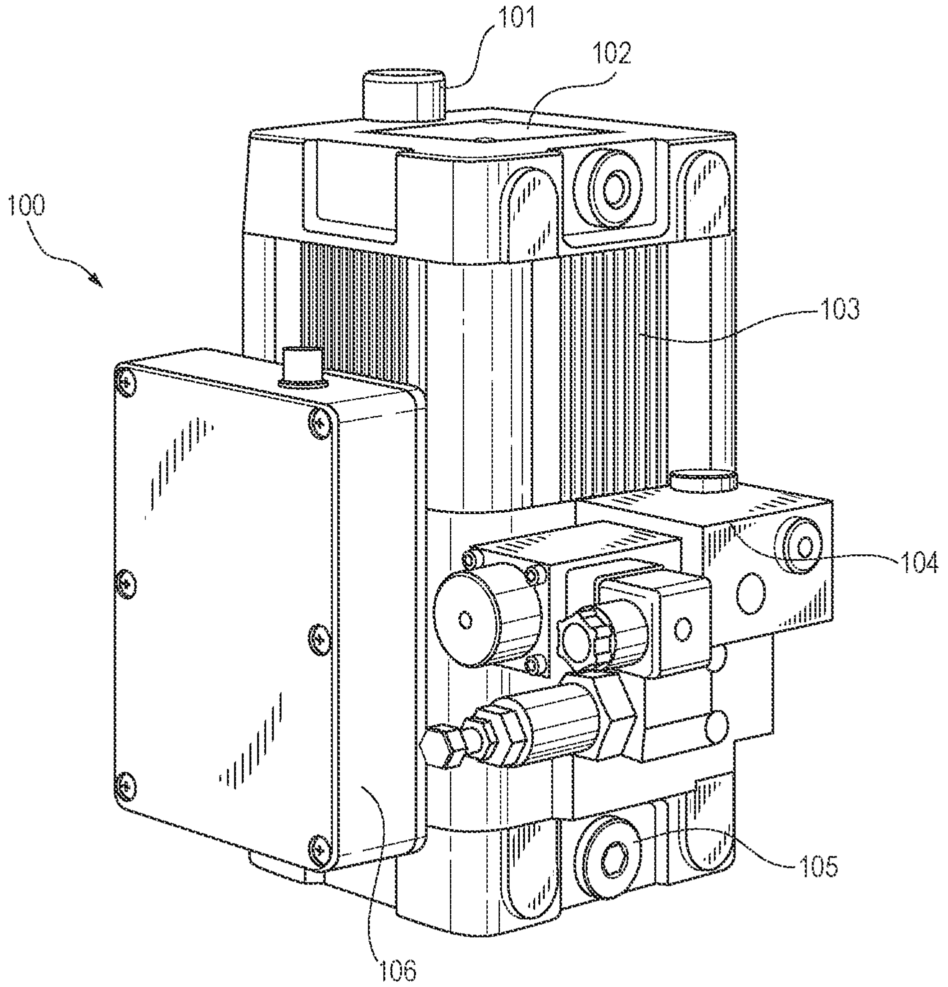
Figure 10:
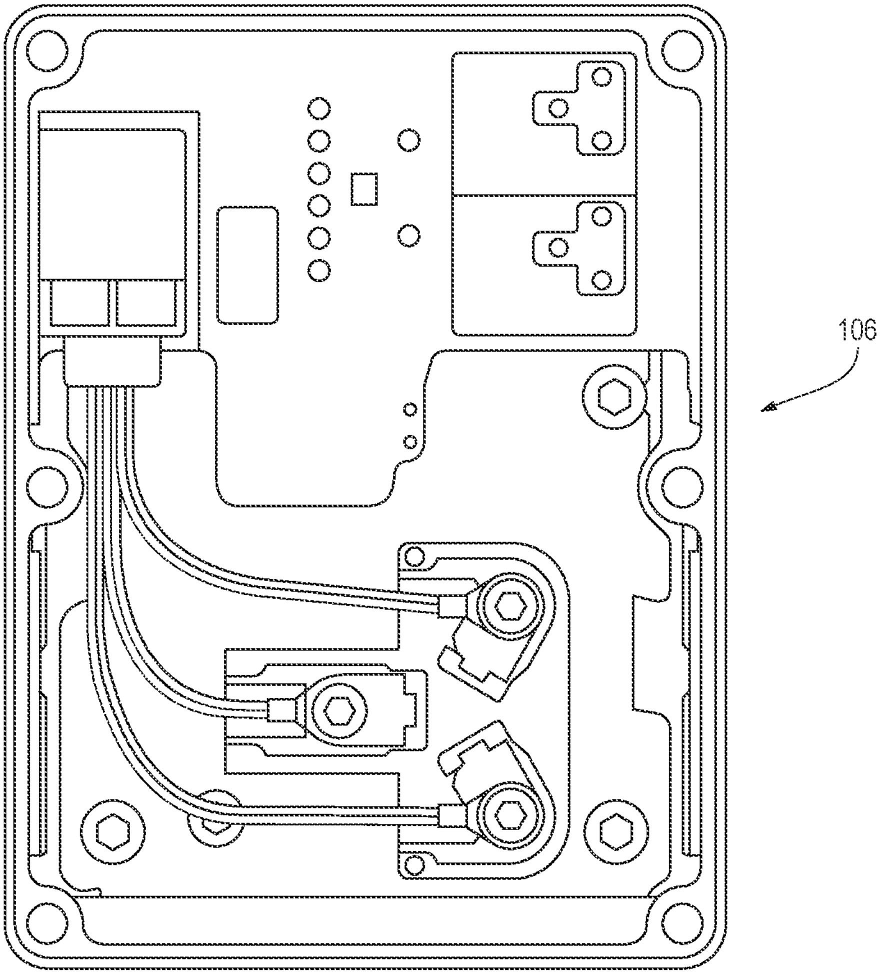
Figure 11:
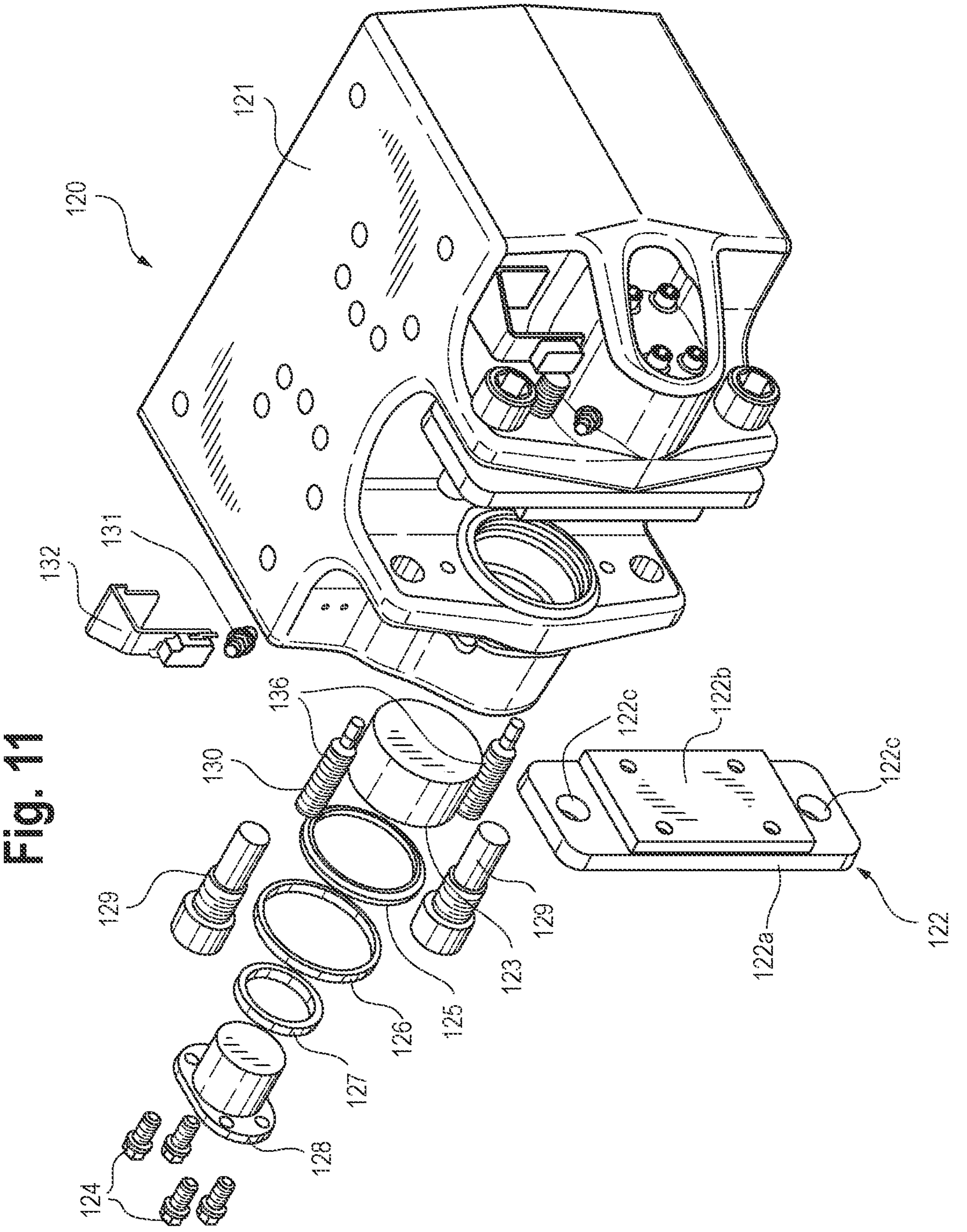
Figure 11A:
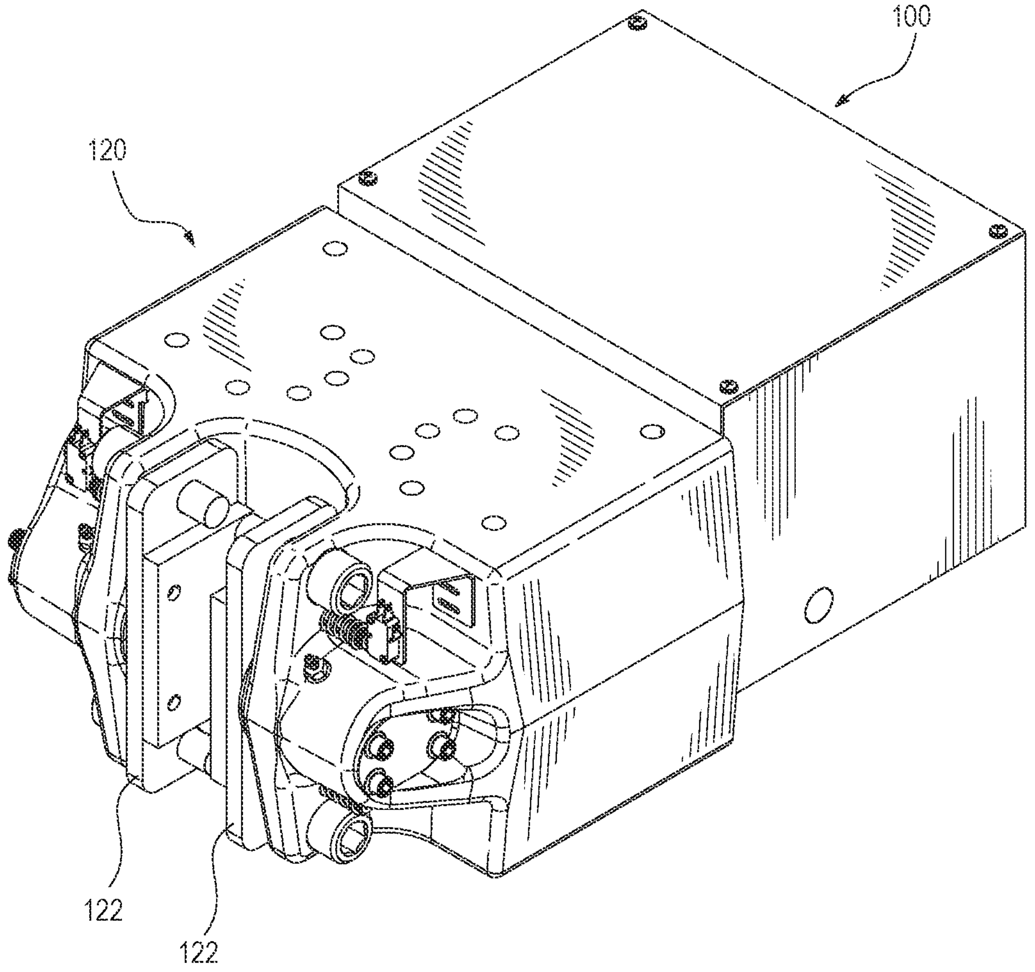
Figure 12A:
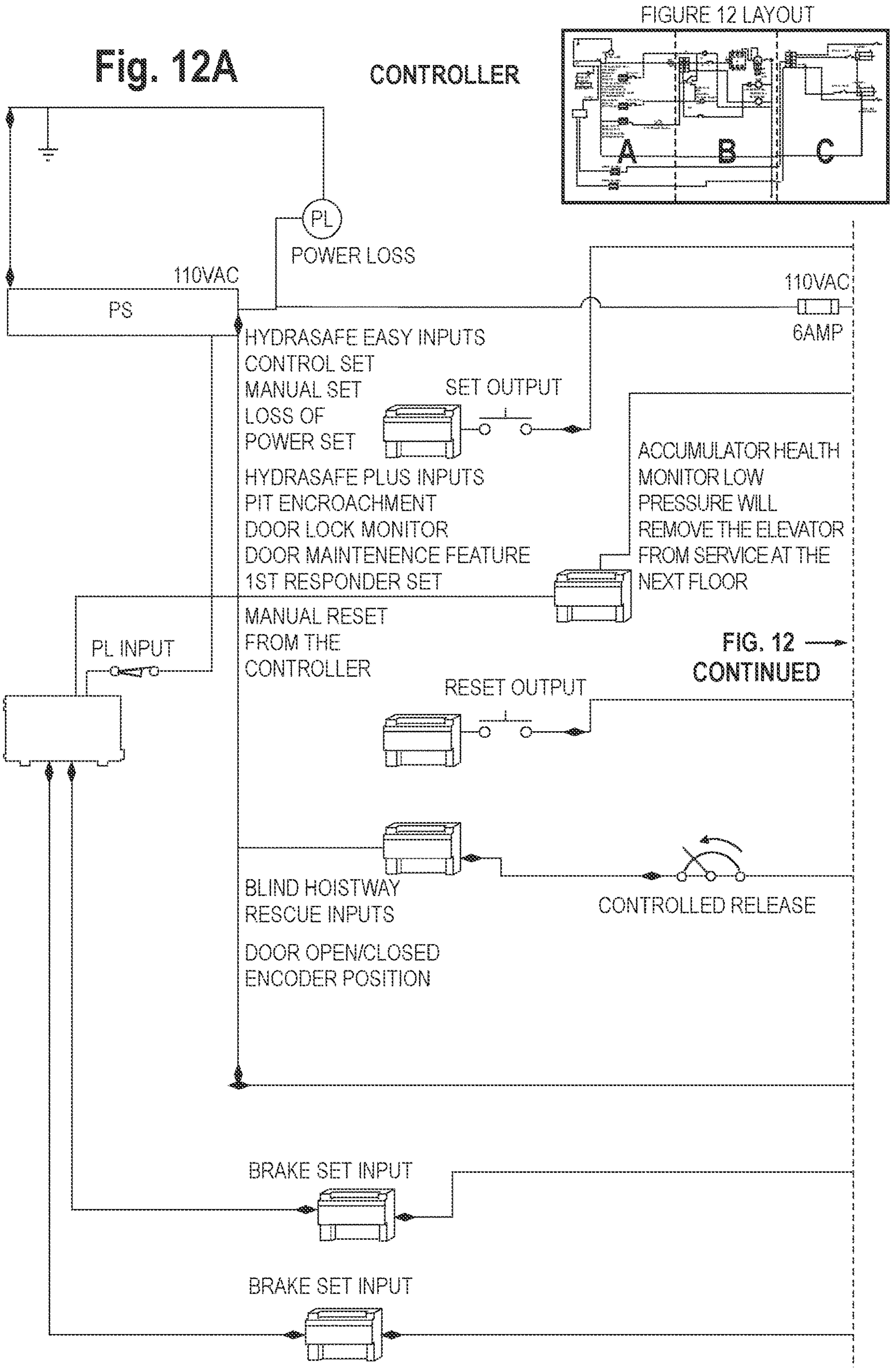
Figure 12B:
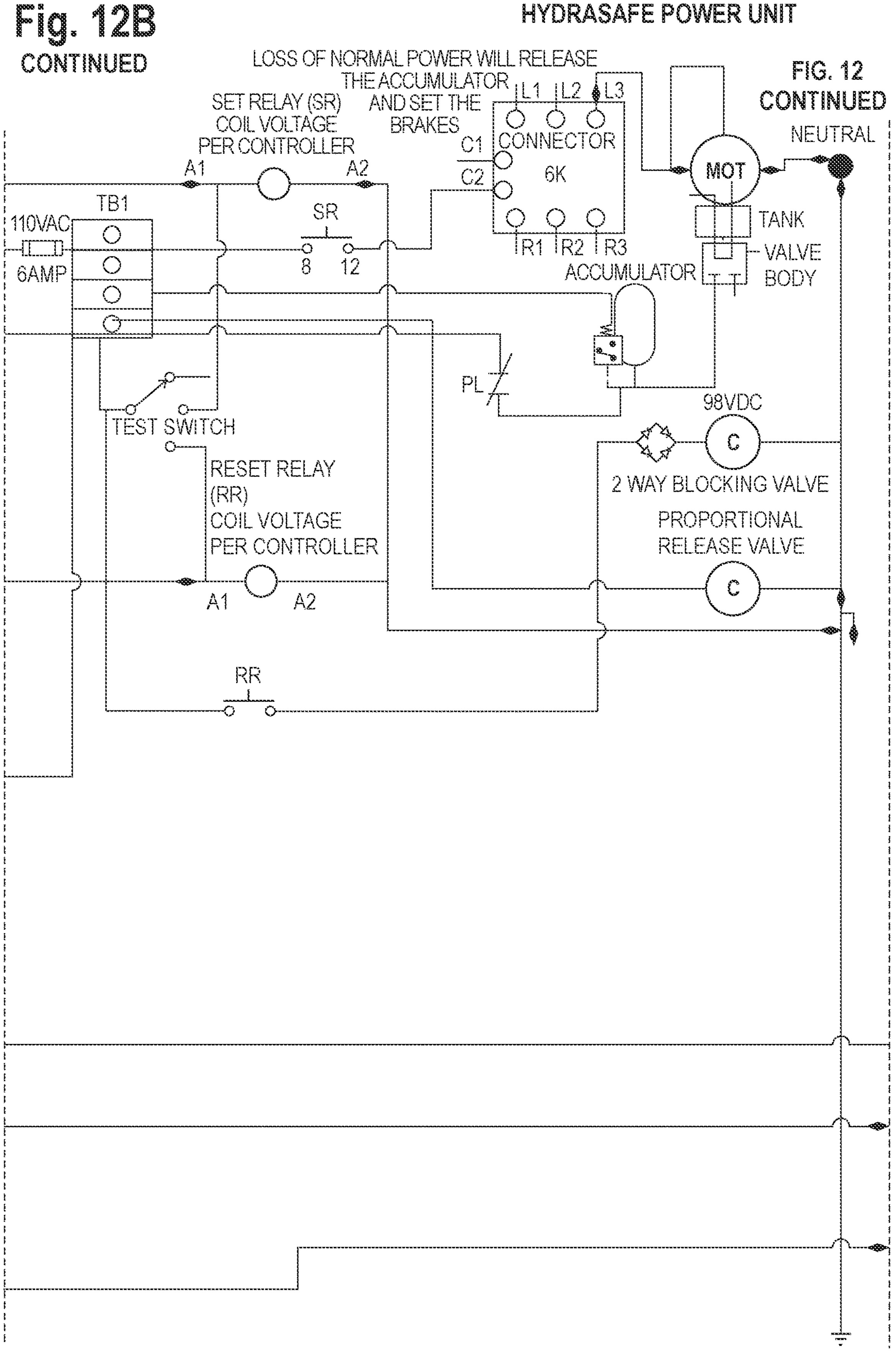
Figure 12C:
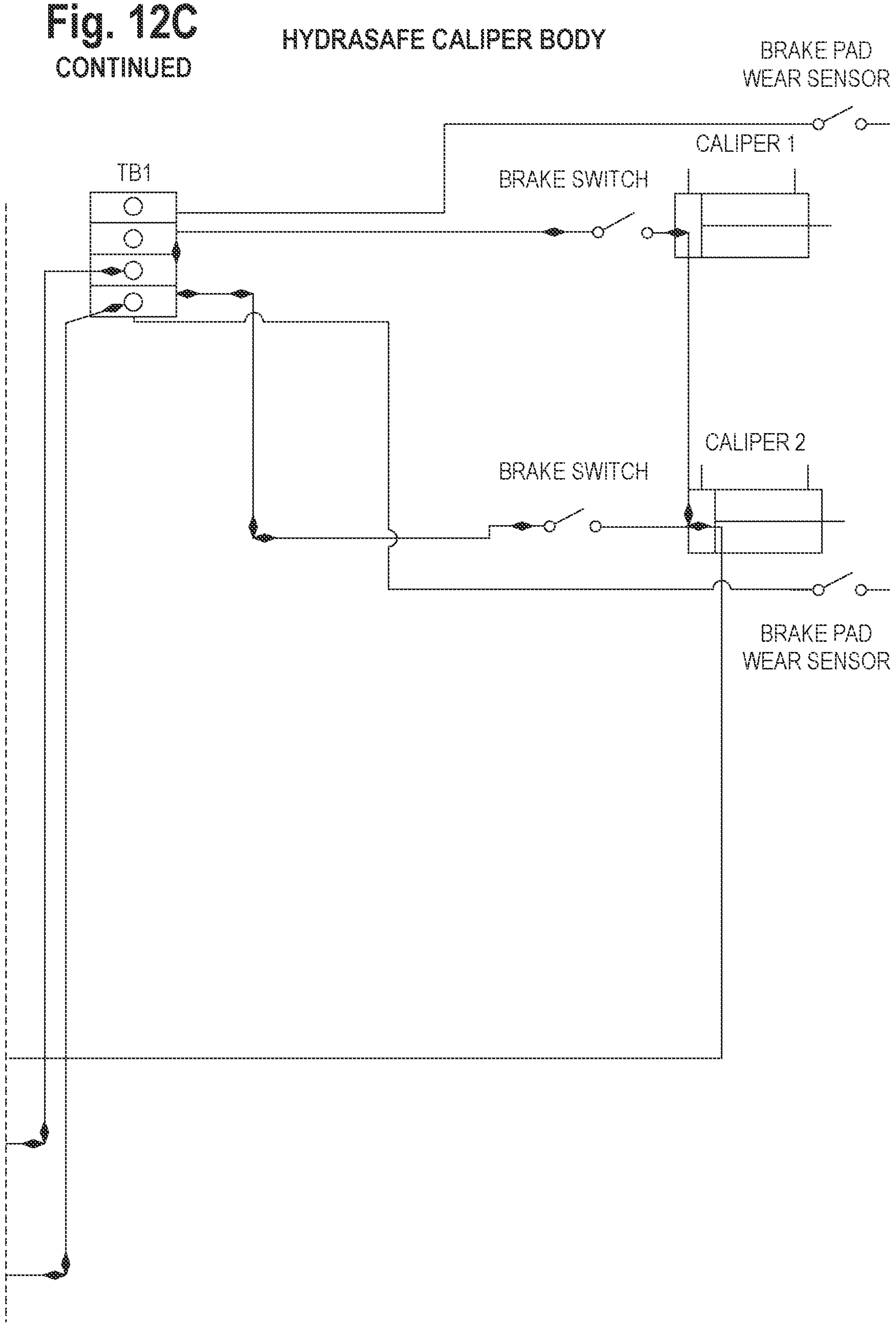

A preferred wiring diagram for an exemplary electrical system using the HydraSafe® safety brakes (for the caliper body, power unit and elevator control system) is shown in FIG. 12.

Persons of ordinary skill will now understand that the Hydrasafe® brake of the present invention is designed to actuate prior to actuation of any existing mechanical safety brake, per applicable code, such as when a 10% over-speed condition in the "up" direction is detected. The Hydrasafe® brake can also be used when such an over-speed condition is detected in the "down" direction, as this will provide an immediate cushioning effect, dampening elevator movement before any safety sets and lessening any impact on elevator car residents. Software can be written to ensure that the Hydrasafe® brake sets, consistent with code requirements, prior to actuation of any existing mechanical safety brake, for any safety condition that is desired to be accounted for. (Generally, the same safety conditions which trigger actuation of the mechanical safety brake will trigger the prior actuation of the Hydrasafe® brake; however, currently, mechanical safety brakes are not used for ascending elevators.)

Persons of ordinary skill in the art will now also understand that the safety brake of the present invention may not only function to brake an unintended ascending elevator device, but can also function as a remotely-activated elevator safety device, replacing such braking devices as a conventional mechanical gradual wedge safety, as well as a bi-directional safety, where code will allow. The safety brake of the present invention may also be used as a dampening device to reduce the impact on passengers in the event of the mechanical safety device actuating. The safety brake of the present invention can also be used on ropeless elevators as the elevator brake to hold the elevator level at the floor.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

We claim:

1. An elevator safety braking assembly for use with a traction-type or hydraulic elevator car carried by opposing guide rails, designed to work in conjunction with a mechanical safety brake, wherein the mechanical safety brake actuates if one or more predetermined safety conditions are triggered, comprising:

one or more hydraulically-powered braking assemblies mounted on at least top or bottom cross-rails, or a safety plank, of the elevator car and designed to selectively brake on one or more of the guide rails, whether the elevator is moving upwardly or downwardly and prior to actuation of the mechanical safety brake, upon detection of the one or more predetermined safety conditions, or upon detection of an uncontrolled or unintended movement of the elevator car other than that which would actuate the mechanical safety brake;

wherein the one or more hydraulically-powered braking assemblies comprise a caliper case housing integrating a piston and brake pad.

2. The elevator safety braking assembly of claim 1, wherein the brake pad comprises a Kevlar composite material with bronze weave embedded in the pad.

3. The elevator safety braking assembly of claim 2, wherein the piston has a diameter in the range of about 2.5-3.0 inches.

4. The elevator safety braking assembly of claim 2, wherein the piston has a diameter of about 2.75 inches.

5. The elevator safety braking assembly of claim 1, wherein the safety braking assembly is useable for elevators with car speeds between 100-2000 feet-per-minute.

6. The elevator safety braking assembly of claim 1, wherein the safety braking assembly is useable for gross loads in excess of 10,000 pounds.

7. The elevator safety braking assembly of claim 1, wherein the one or more predetermined safety conditions comprise one or more of the following: a predetermined speed is exceeded, whether in the ascending or descending direction; elevator door lock jumper protection; elevator pit encroachment; retardant braking for preventing an added heavy load from moving the elevator off of floor level; conditions of elevator hoist doors, and elevator car doors; conditions of an elevator safety string; an elevator system encoder; brake inputs; valve inputs; and setting the elevator car to remove passengers without first securely rigging/fastening the elevator car.

8. The elevator safety braking assembly of claim 7, wherein the elevator safety string includes safety circuits which monitor one or more of the following: reverse phase relay; top and bottom final; pit switch; car top stop switch; governor overspeed switch; safety operated switch; and drive ready relay.

9. The elevator safety braking assembly of claim 1, wherein the elevator car comprises a traction-type elevator car with or without hoist ropes.

10. The elevator safety braking assembly of claim 1, wherein each of the one or more hydraulically-powered braking assemblies includes roller guides in mechanical connection with one or more of the guide rails, and hydraulic disc brakes.

11. The elevator safety braking assembly of claim 10, wherein one or more of the roller guides include shock-absorbing elements.

12. The elevator safety braking assembly device of claim 1, wherein solid shoes are associated with each of the one or more hydraulically-powered braking assemblies.

13. The elevator safety braking assembly of claim 9, wherein the one or more hydraulically-powered braking assemblies may be used with guide rails having differing cross-sectional shapes comprising one or more of the following: T-shaped, hat-shaped, omega-shaped, and round.

* * * * *